United States Patent
Claussen et al.

(10) Patent No.: US 9,938,980 B2
(45) Date of Patent: Apr. 10, 2018

(54) SYSTEM FOR MEASURING AIR MASS FLOW INTO A GAS TURBINE

(71) Applicant: SIEMENS ENERGY, INC., Orlando, FL (US)

(72) Inventors: Heiko Claussen, North Brunswick, NJ (US); Joshua S. McConkey, Orlando, FL (US); Richard H. Bunce, Glen Mills, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 77 days.

(21) Appl. No.: 15/267,295

(22) Filed: Sep. 16, 2016

(65) Prior Publication Data

US 2017/0002821 A1   Jan. 5, 2017

Related U.S. Application Data

(63) Continuation-in-part of application No. PCT/US2014/031013, filed on Mar. 18, 2014.

(51) Int. Cl.
    *F04D 27/00*   (2006.01)
    *F04D 29/54*   (2006.01)
    (Continued)

(52) U.S. Cl.
    CPC ............ *F04D 27/001* (2013.01); *F02C 7/055* (2013.01); *F02C 7/057* (2013.01); *F02C 9/00* (2013.01);
    (Continued)

(58) Field of Classification Search
    CPC .... F04D 27/001; F04D 29/545; F04D 29/701; G01M 15/14; G01F 1/76; F02C 9/00;
    (Continued)

(56) References Cited

U.S. PATENT DOCUMENTS

| | | | | |
|---|---|---|---|---|
| 4,515,609 A | * | 5/1985 | Cuvelier | B01D 46/002 55/287 |
| 8,157,890 B2 | * | 4/2012 | Brioschi | F24F 11/001 55/338 |

(Continued)

FOREIGN PATENT DOCUMENTS

WO   2015142318 A1   9/2015

OTHER PUBLICATIONS

PCT International Search Report and Written Opinion of International Searching Authority dated Nov. 9, 2017 corresponding to PCT International Application No. PCT/US2017/046202 filed Aug. 10, 2017.

*Primary Examiner* — Peter Macchiarolo
*Assistant Examiner* — Anthony W Megna Fuentes (57) ABSTRACT

A method for measuring air mass flow into a compressor section of a gas turbine engine is provided. Air is introduced into a chamber upstream from an inlet of the compressor section. The chamber includes filter packages with at least some of the filter packages including a flow sensor and a filter structure, the filter structure filtering the air. The flow sensors measure the velocity of the air flowing through the corresponding filter package. A controller uses the air flow sensor signal data to characterize a two dimensional flow field through the chamber. Additionally, a plurality of temperature, humidity, and static pressure sensors are disposed throughout the filter packages. The controller uses the temperature, humidity, and static pressure sensor signal data to characterize a two dimensional density field through the chamber. The controller combines the flow field with the density field to calculate a two dimensional air mass flow field.

15 Claims, 4 Drawing Sheets

(51) Int. Cl.
*F04D 29/70* (2006.01)
*G01M 15/14* (2006.01)
*G01F 1/76* (2006.01)
*F02C 9/00* (2006.01)
*F02C 7/055* (2006.01)
*F02C 7/057* (2006.01)
*B01D 46/44* (2006.01)
*B01D 46/00* (2006.01)

(52) U.S. Cl.
CPC ......... *F04D 29/545* (2013.01); *F04D 29/701* (2013.01); *G01F 1/76* (2013.01); *G01M 15/14* (2013.01); *B01D 46/0023* (2013.01); *B01D 46/0086* (2013.01); *B01D 46/444* (2013.01); *F05B 2220/302* (2013.01); *F05D 2240/12* (2013.01); *F05D 2260/607* (2013.01); *F05D 2260/80* (2013.01); *F05D 2270/3061* (2013.01); *F05D 2270/80* (2013.01)

(58) Field of Classification Search
CPC .... F02C 7/055; F02C 7/057; F05B 2220/302; F05D 2260/607; F05D 2260/80; F05D 2270/3061; F05D 2270/80; F05D 2240/12; B01D 46/444; B01D 46/0086; B01D 46/0023
USPC ......... 73/112.03, 112.05; 415/121.2; 96/417, 96/420–422
See application file for complete search history.

(56) References Cited

U.S. PATENT DOCUMENTS

| 2011/0277441 | A1* | 11/2011 | Ayshford | B01D 46/0058 60/39.092 |
| 2011/0299973 | A1* | 12/2011 | Zhang | B01D 46/0023 415/121.2 |
| 2012/0137876 | A1* | 6/2012 | Miller | B01D 46/0043 95/23 |
| 2014/0208764 | A1* | 7/2014 | Ekanayake | F02C 9/16 60/773 |
| 2016/0089624 | A1* | 3/2016 | Hopple | B01D 46/0086 95/25 |
| 2016/0348532 | A1* | 12/2016 | Di Raimondo | F01D 21/003 |

* cited by examiner

SYSTEM FOR MEASURING AIR MASS FLOW INTO A GAS TURBINE

CROSS-REFERENCE TO RELATED APPLICATIONS

This application is a continuation in part of PCT Application Serial No. PCT/US2014/031013, titled, System and Method for Monitoring Air Flow into a Turbine Engine, filed Mar. 18, 2014 and as such claims the benefit of its priority date which is hereby incorporated by reference.

BACKGROUND

1. Field

The present disclosure relates generally to a method and system for measuring the air mass flow into an inlet of a compressor section of a gas turbine engine, and more particularly, to a method and system for measuring the total air mass flow into the inlet of a compressor section of a gas turbine engine.

2. Description of the Related Art

In a turbomachine, such as a gas turbine engine, air is pressurized in a compressor section then mixed with fuel and burned in a combustion section to generate hot combustion gases. The hot combustion gases are expanded within a turbine section of the engine where energy is extracted from the combustion gases to power the compressor section to produce useful work, such as turning a generator to produce electricity.

Air mass flow is a key measurement of determining the efficiency of a gas turbine. This quantity is difficult to measure accurately because the most accurate measurement methods themselves create an impedance to air flow, which significantly reduces the power produced by the engine. Other techniques have proven extremely expensive, inaccurate, or accurate but requiring a large configuration space.

One such conventional method of accurately measuring air mass flow into a large gas turbine is to use a large array of large nozzles. The flow nozzles have a very low impedance and thus can provide an accurate measurement of the air mass flow. However, using a flow nozzle requires ample space to accommodate its setup requirements and is very expensive. Additionally, the relatively high pressure drop across the flow nozzle reduces the power output of the engine.

Another conventional method frequently used, commonly referred to as the Scroll dP method, estimates the air mass flow of the gas turbine by a formula using the output performance of the system, fuel parameters, the difference between the compressor intake barometric pressure at the compressor inlet and the static pressure at the throat of the inlet scroll and intake air temperature. While the estimate is fairly accurate when used for high load operation, it not consistently accurate under all load conditions. Additionally, this method only gives a mass flow estimate for performance evaluation and is not useful for monitoring the flow distribution in the air intake. Thus, it cannot be used to optimize the flow performance of the air intake locally.

An accurate and inexpensive method to measure air mass flow at the inlet to a compressor section of a gas turbine engine is desired.

SUMMARY

Briefly described, aspects of the present disclosure relates to a method for measuring an air mass flow into a compressor section of a gas turbine engine and a system for measuring an air mass flow into a compressor section of a gas turbine engine.

A method for measuring an air mass flow into a compressor section of a gas turbine engine is provided. Air is introduced into a chamber upstream from an inlet of the compressor section, where substantially all of the air introduced into the chamber pass through one of a plurality of filter packages arranged in parallel. At least some of the filter packages include a flow sensor and a filter structure, the filter structure filters the air. The flow sensors measure the velocity of the air flowing through the corresponding filter package. A controller uses the air flow sensor signal data to characterize a two dimensional flow field through the chamber. Additionally, a plurality of sensors are disposed throughout the plurality of filter packages. The plurality of sensors includes temperature, humidity and static pressure sensors. The controller uses the temperature, humidity, and static pressure sensor signal data to characterize a two dimensional density field through the chamber. Then, the controller combines the flow field with the density field to calculate a two dimensional air mass flow field.

A system for measuring an air mass flow into a compressor section of a gas turbine section is provided. The system includes a chamber upstream from an inlet of the compressor section. Additionally, the system includes a plurality of filter packages in fluid communication with at least one opening in the chamber. The chamber includes the at least one opening through which air enters the chamber and an outlet through which air enters into the inlet of the compressor section. The plurality of filter packages are arranged in parallel such that substantially all of the air entering the chamber for introduction into the compressor section passes through a corresponding one of the filter packages. At least some of the filter packages include a flow sensor and a filter structure that filters the air being routed from the at least one outlet of the chamber to the inlet of the compressor section. At least some of the filter packages include at least one sensor of a plurality of sensors selected from the group consisting of temperature sensors, humidity sensors, and static pressure sensors. Each flow sensor measures the velocity of the air flowing through the corresponding filter package.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Within the air intake installation into the gas turbine, two of the types of filter structures may be used for filtering the air going into the compressor section are described below. Flat static rectangular filters are typically installed in the air intake installation in a grid-like pattern such that the filters are parallel and lie in the same plane. Conical self-cleaning filters may also be used in the intake installation and lie parallel to one another. These self-cleaning pulse filters are frequently used in dusty environments and are activated as a function of dust loading. When the self-cleaning feature is activated, a pulse of air is shot through the filter cleaning out the dust accumulated in the filter structure. An inexpensive and accurate mass flow measurement system may be inserted into the compressor inlet of a gas turbine engine using both types of filters, flat static filters and conical pulse filters, is discussed below. While two types of filters are discussed below in connection with the presented method, one skilled in the art would understand that other types of filters also may be used in the proposed method.

Figure 1:
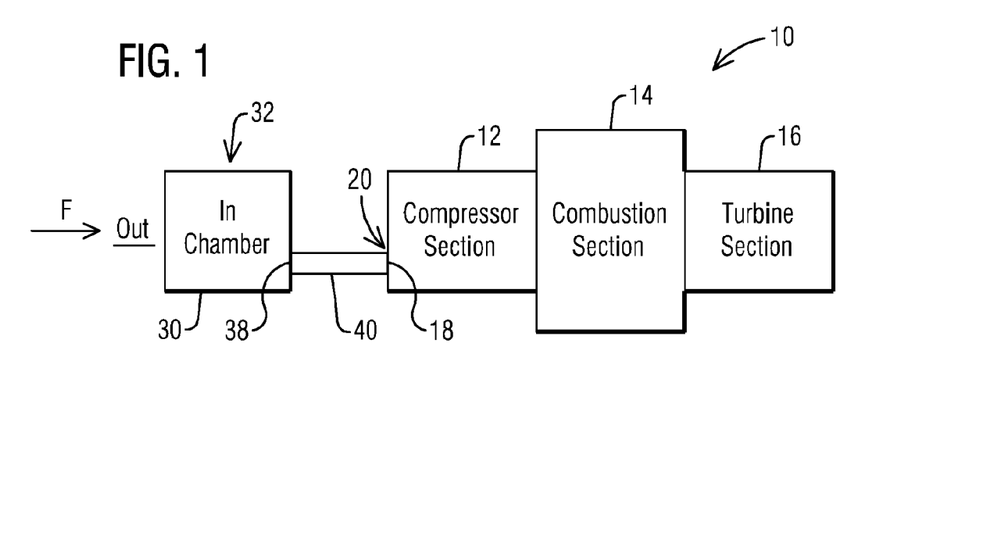
FIG. 1 is a schematic diagram of a turbine engine including a chamber upstream from a compressor section of the engine according to an embodiment.

Referring now to FIG. 1, a gas turbine engine 10 is schematically shown. The engine 10 includes a conventional compressor, combustion, and turbine sections 12, 14, 16 which will not be discussed in detail herein.

The compressor section 12 includes at least one inlet guide vane 18 located at an inlet 20 of the compressor section 12 (hereinafter compressor inlet 20), wherein an angle of the at least inlet guide vane 18 can be adjusted to fine tune an amount of air that enters the compressor inlet 20 as known in the art.

As shown in FIG. 1, upstream from the compressor section 12 is a chamber 30. A flow of air F is introduced into the chamber 30. The chamber 30 is part of a system 32 used for monitoring air flow into the compressor section 12 as will be discussed in detail herein. The chamber 30 may be a large volume for routing a large amount of air into the compressor inlet 20.

Figure 2:
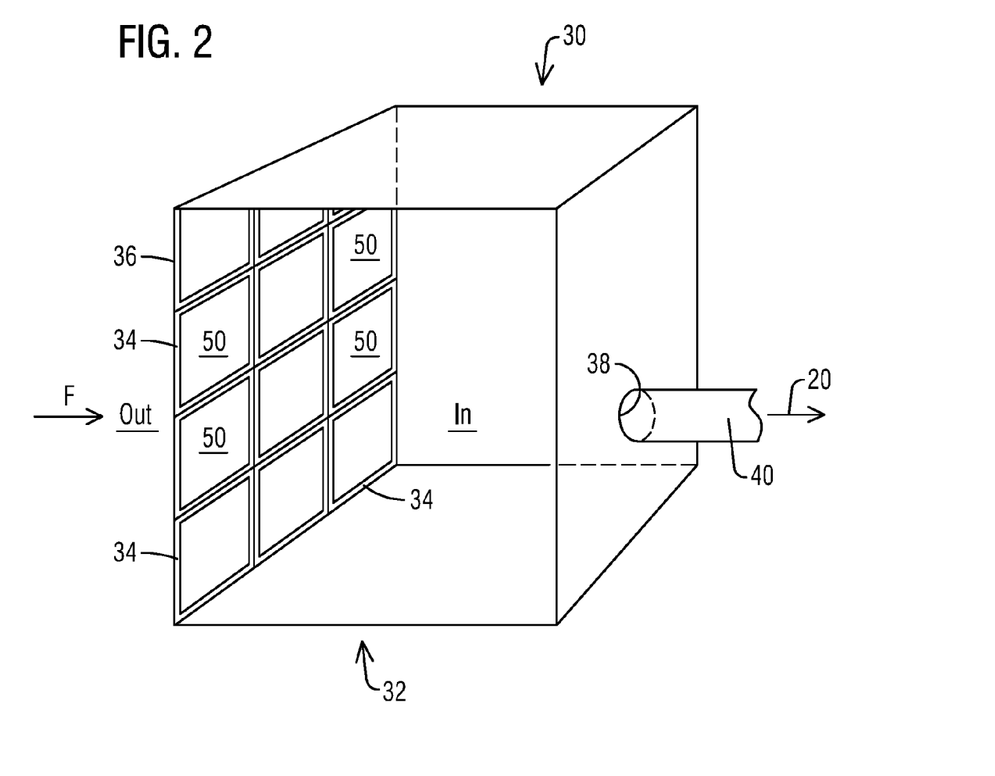
FIG. 2 is a perspective schematic diagram of the chamber illustrated in FIG. 1.

Referring now to FIG. 2, the chamber 30 includes at least one opening 34 through which air, e.g., ambient air F, enters the chamber 30. In the embodiment shown in FIG. 2, the chamber 30 comprises a series of openings 34 arranged in parallel along an outer wall 36 of the chamber 30 opposite the compressor inlet 20, although the chamber 30 can have any configuration of openings 34 located at any position in the chamber 30, including a single large opening formed in the wall 36.

The chamber 30 further comprises at least one outlet 38 through which air is routed to the compressor inlet 20. In the embodiment shown, the air is directly routed from the chamber 30 to the compressor inlet 20 via one or more air supply pipes 40 (see also FIG. 1), although the air may be routed to one or more other structures before passing to the compressor inlet 20, and the air may be routed to the compressor inlet 20 via other suitable conveying structures as desired.

The chamber 30 preferably contains no non-sealed openings other than the openings 34 and the outlet 38, to substantially prevent leakage of air (and other fluids) into and out of the chamber 30. That is, there is preferably no fluid ingress or egress into or out of the chamber 30 other than the entry of air into the openings 34 and the exit of air out of the outlet 38 during normal operation.

The chamber 30 further comprises a plurality of filter packages 50 in fluid communication with the openings 34. As shown in FIG. 2, the filter packages 50 are arranged within the respective openings 34 such that the filter packages 50 are arranged in parallel, wherein substantially all of the air entering the chamber 30 for subsequent introduction into the compressor section 12 passes through a corresponding one of the filter packages 50. The filter packages 50 are sealed within the respective openings 34 such that air is not permitted to bypass a filter package 50 through a corresponding opening 34. In the embodiment shown in FIG. 2, the filter packages are shown as rectangular and essentially planar, fitting within the plane of the openings 34.

In the embodiment using conical pulse filters 75, the pulse filters may be arranged in a single plane, opening 34 in FIG. 2, perpendicular to the flow of air F. The conical side is pointed against the air flow F direction. That is, the smaller end of the cone is on the OUT side of the chamber 30 in the fresh air while the larger outlet of the cone is on the inside of the chamber 30 towards the inlet 20 of the compressor. In an embodiment, the conical pulse filters 75 may be mounted onto the outer wall which includes holes that could accommodate the larger end of the each conical pulse filter such that the large end of the conical pulse filter 75 fits into the hole.

Figure 3:
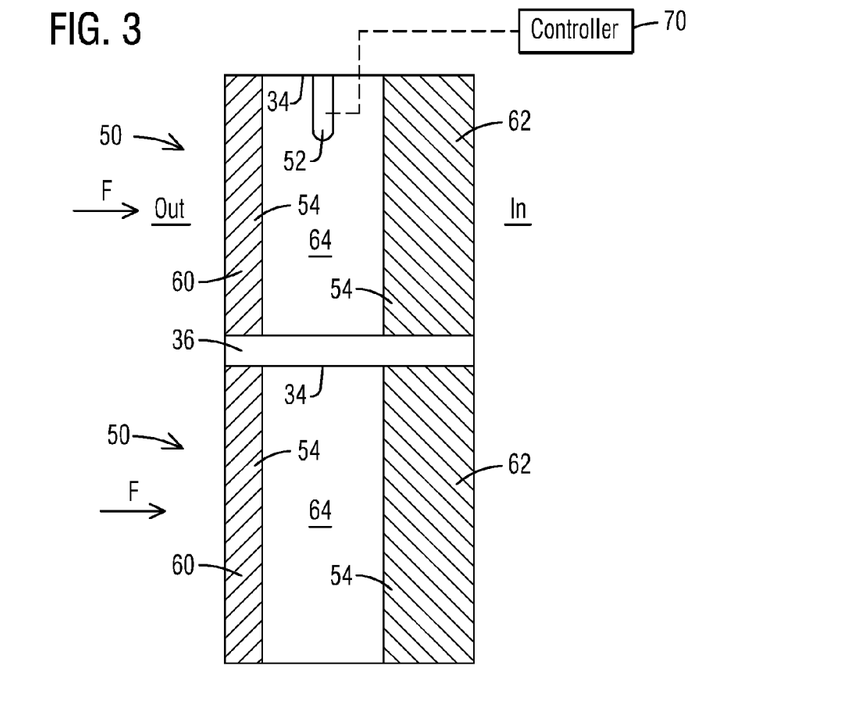
FIG. 3 is a side cross sectional view illustrating two filter packages provided in the chamber of FIG. 2 according to an embodiment.

Referring now to FIG. 3, two adjacent filter packages 50 are illustrated according to an embodiment. At least some of the filter packages 50 in the system 32 comprise a flow sensor 52 and filter structure 54, which filter structure 54 can take many forms, one of which will be described herein respectively with reference to FIG. 3. As shown in FIG. 3, the filter structure 54 according to this embodiment comprises a pre-filter 60, also referred to herein as a component of the filter structure 54 (or a filter structure component) upstream from the flow sensor 52. The pre-filter 60 straightens air passing therethrough, i.e., air passing from outside Out of the chamber 30 to inside In of the chamber 30 through the pre-filter 60 as shown in FIG. 3, such that the air flows generally in a two dimensional laminar fashion through the flow sensor 52, which flow sensor 52 is downstream from the pre-filter 60 as shown in FIG. 3. This is preferable for a more accurate flow reading taken by the flow sensor 52, which reading will be discussed in more detail below. The pre-filter 60 may comprise any suitable structure, such as, for example, a Donaldson PT19-1249 pre-filter.

As shown in FIG. 3, the filter structure 54 according to this embodiment also comprises a main filter 62 that serves as a main filter element for filtering the air passing into the inside IN of the chamber 30 to be routed from the at least one outlet 38 of the chamber 30 to the compressor inlet 20. The main filter 62 may comprise any suitable structure, such as, for example, a Donaldson NORRVEE series Element Assembly.

Referring still to FIG. 3, the flow sensor 52 according to this embodiment is located in a flow passage 64 defined within the filter package 50 between the pre-filter 60 and the main filter 62. In this embodiment, the filter packages 50 are arranged as parallel flow measurement boxes. The flow sensor 52 may comprise any suitable structure, such as, for example, a Ruskin model AMS flow meter. These flow measurement devices are typically used in the air-conditioning industry. The exemplary flow sensor 52 according to this embodiment measures the velocity of the air flowing therethrough and sends a signal to a controller 70 based on the measured velocity, see FIG. 3, although it is noted that other types of flow sensors could be used without departing from the spirit and scope of this disclosure.

The controller 70 receives the signals from all of the flow sensors 52 in the system 32 and calculates a flow rate of air into chamber 30 for introduction into the compressor section 12 based in part on the received signals. More specifically, according to an embodiment, the total air flow through each corresponding filter package 50 that includes a flow sensor 52 is calculated by the controller 70 using the measured velocity of the air, e.g., provided in the signal sent to the controller 70 by the corresponding flow sensor 52, a temperature of the air, which may be provided to the controller 70 in any known manner, and a flow area defined by the corresponding filter package 50, which flow area is measured in a plane perpendicular to the flow direction of the air passing through the flow passage 64 and is a known value that is input to the controller 70. The controller calculates the flow rate through each corresponding filter package 50 that has a flow sensor 52 in a known manner, e.g., using the parameters as discussed above.

The controller 70 may calculate the total air flow into the chamber 30 for introduction into the compressor section 12 using the sum of the calculated total air flows through each filter package 50 having a flow sensor 52, and, for any filter packages 50 that do not include a flow sensor 52, estimated air flows through filter packages 52. The estimated air flows through any filter packages 50 that do not include a flow sensor 50 can be made in any suitable manner, such as, for example, by using an average of the calculated total air flows through each filter package 50 having a flow sensor 52. It is noted that the controller 70 may calculate the total air flow into the chamber 30 for introduction into the compressor section 12 using other suitable techniques, such as, for example, using averages of the calculated total air flows through each filter package 50 having a flow sensor 52 and multiplying the averages times the number of filter packages 50 rather than summing.

As mentioned above, not all of the filter packages 50 must include a flow sensor. The flow sensors may be sparsely distributed throughout the filter packages 50 over the gas turbine air intake installation such that a percentage of the filter packages 50 include a flow sensor 52. A typical percentage of filter packages 50 that include a flow sensor 52 may lie in a range of 15 to 50%. An embodiment of a distribution of flow sensors 52 throughout the filter packages 50 in a gas turbine air intake installation, illustrated in the FIGS. 1-3 as chamber 30, may be seen in FIG. 5. The flow sensors 52 may be distributed such that they are evenly distributed throughout the gas turbine air intake. In another embodiment, the distribution of the flow sensors 52 may take into account areas of high flow and the flow gradients to minimize the interpolation errors.

Through the use of computer modelling done on the controller 70, only the percentage of the filter packages 50 need to include a flow sensor 52, as the modelling can interpolate the air flow signal data to determine an estimated flow out of the filter packages 50 without a flow sensor 52. Any such filter packages 50 not including a flow sensor 52 according to this embodiment preferably still comprise a filter structure 54 that includes pre and main filters 60, 62, wherein the pre-filters 60 would straighten air passing therethrough such that the air flows generally in a two dimensional laminar fashion through a flow passage 64 defined between the pre and main filters 60, 62, and the main filter 62 provides a main filter element for filtering the air after the air passes through the pre-filter 60 for being routed from the outlets of the chamber 30 to the compressor inlet 20.

In another embodiment, a conical pulse filter arrangement may be used in the chamber 30. The conical pulse filters lie parallel to one another in an air flow direction. A flow sensor arrangement as described above with reference to FIG. 3, presents several problems for a conical pulse filter arrangement. Firstly, because the filter packages 50 in this embodiment are rectangular, their outlets will not match up to the conical filter inlet with the result that air flow can easily pass behind the filters and cause uncertainty in the flow measurement. Secondly, when the self-cleaning feature is activated, dust may be blown into the flow passage containing the flow sensor and block the sensor measurement ports. Thus, in an embodiment, a different arrangement of the filter packages 50 is proposed.

Figure 4:
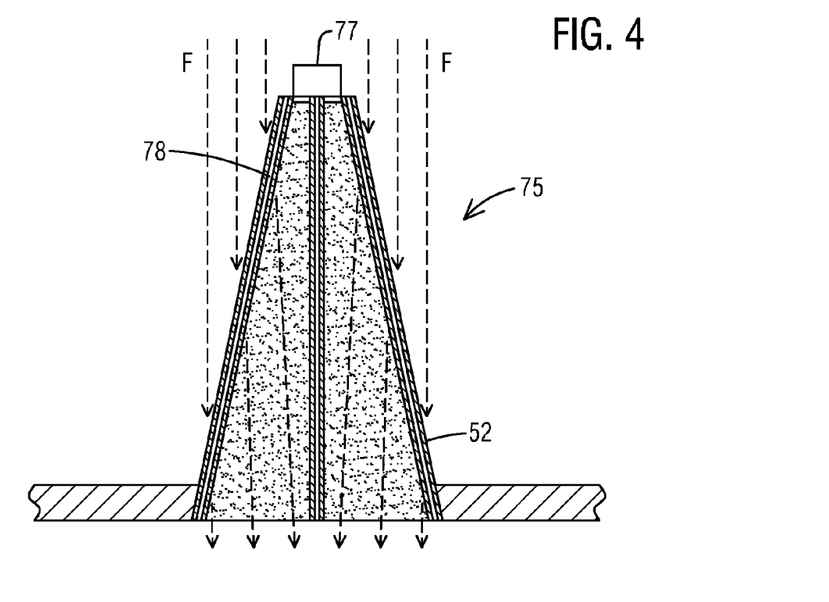
FIG. 4 is a cross sectional view illustrating a conical filter package according to a further embodiment.

Referring now to FIG. 4, a filter package comprising a conical pulse filter 75 with a sensor system 77 is presented according to an embodiment. The illustrated embodiment shows a cross section of a conical pulse filter 75. Internal rigid stabilization bars 78 are used to stabilize its conical structure. The air flow F into the pulse filter 75 is denoted by the arrows. The flow sensors 52 are disposed within the stabilization bars 78 such that the air flow F passes through the flow sensors 52 enabling them to accurately measure the air flow F. The pulse filter 75 includes a cover plate on top of which a sensor system 77 is attached including temperature, humidity and static pressure sensors. The location of the sensor system 77 is easily accessible making it easy to maintain. Additionally, the placement of the sensor system 77 on the cover plate does not obstruct the air flow F through the pulse filters 75.

Figure 5:
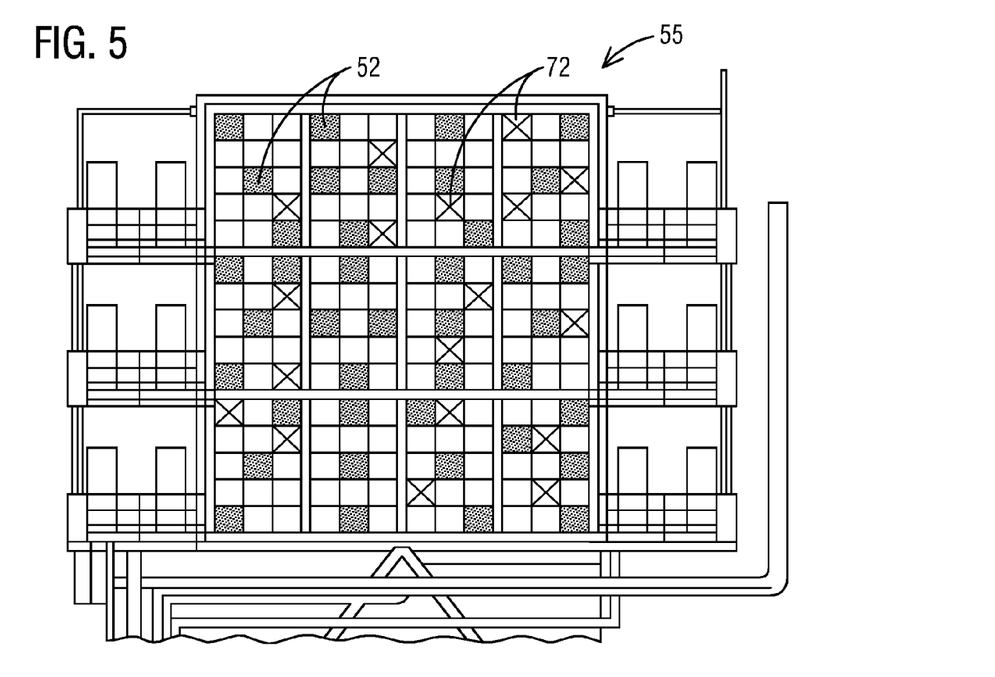
FIG. 5 illustrates a scattered distribution of flow sensors and temperature, humidity, and static pressure sensors in air intake installation.
Figure 6:
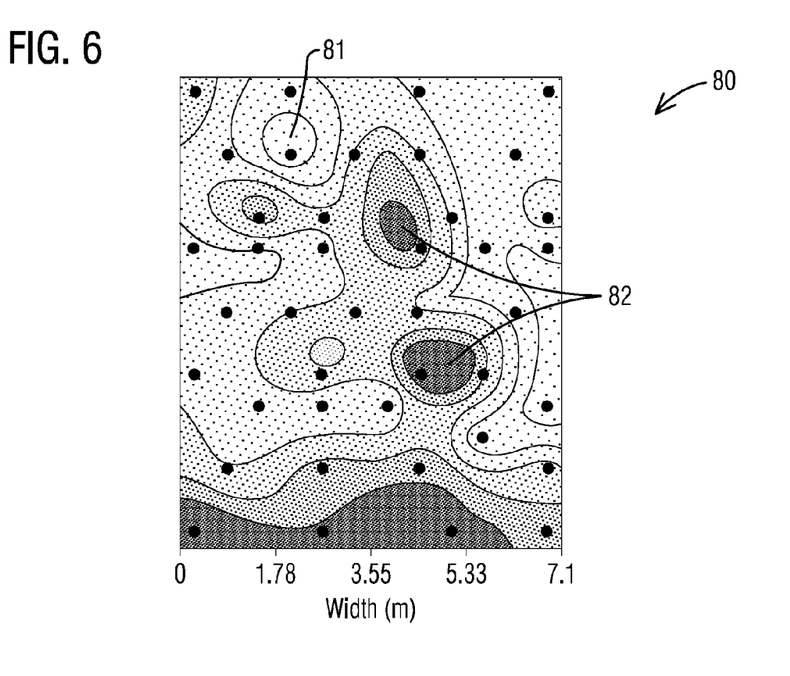
FIG. 6 illustrates an interpolated flow field.

Using the calculated total air flow through each filter package 50 having a flow sensor 52 and the estimated air flow through the filter packages 50 that do not include a flow sensor 52, a two dimensional flow field map may be created. An example of an interpolated two-dimensional flow field map 80 corresponding to the embodiment of the inlet filter house as shown in FIG. 5 is illustrated in FIG. 6. The different shading represents varying air flow and the black dots correspond to the centers of the air flow sensors 52.

In order to obtain the mass flow through the chamber 30, the density of the air in the chamber 30 also needs to be calculated. Using a distribution of pressure sensors, temperatures, and humidity sensors 72 throughout the filter packages 50 similarly to the distribution of air flow sensors 52 throughout the filter packages 50, a density field may be created. The Xs in FIG. 5 illustrate the location within the filter packages of pressure sensor, a temperature sensor, and/or a humidity sensor 72. Not all the filter packages 50 must include a pressure sensor, temperature sensor or a humidity sensor 72. Each filter package 50 may include a pressure sensor, a humidity sensor, a temperature sensor, or a combination of these sensors 72. Also, each filter package 50 including an air flow sensor 52 may include a pressure sensor, a humidity sensor or a combination of these sensors 72. Each filter package 50 including an air flow sensor 52 may not include any of a pressure sensor, a humidity sensor, or a combination of these sensors 72. Using the sensor signal data from the distributed pressure, temperature, and humidity sensors 72, an interpolated density field similar to the interpolated air flow field 80, as shown in FIG. 6, may be calculated by the controller 70.

The interpolated flow field 80 may be multiplied by the interpolated density field to obtain an air mass field characterizing the air mass flow in the chamber 30 and into the inlet 20 of the compressor. Summing the air mass flow in each of the filter packages 50 from the air mass flow field 90 will give a total air mass flow in the chamber 30 and hence into the inlet 20 of the compressor.

The controller 70 may include, but is not limited to, a central processing unit (CPU), a processor or processing device, memory, storage devices, communication links and devices, servers, I/O devices, or any sub-components of one or more processing systems, including software, firmware, hardware or any combination or subset thereof, which embody the invention as set forth in the claims.

Figure 7:
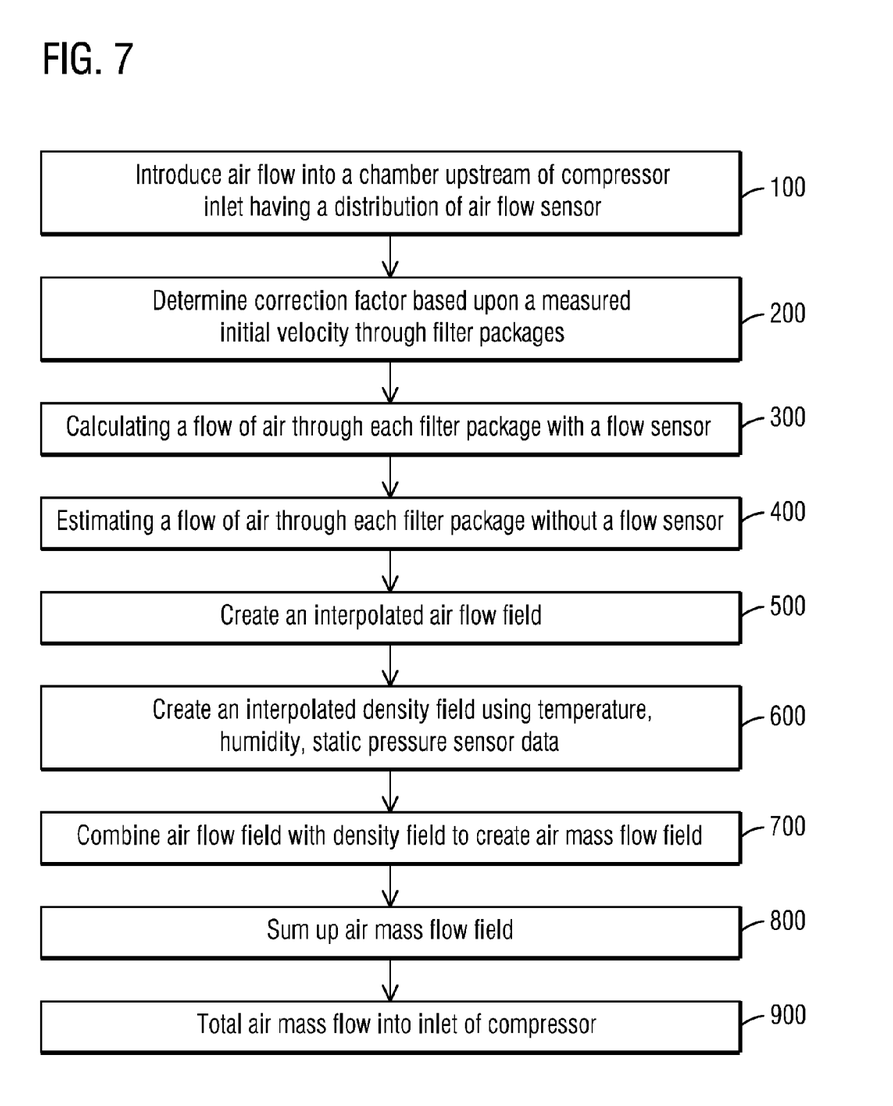
FIG. 7 illustrates a flow chart including the proposed method steps.

Referring to FIGS. 1-7, a method for measuring an air mass flow into a compressor section 12 of a gas turbine 10 is also provided. FIG. 7 illustrates a flowchart with steps in the method, however, the steps do not necessarily have to be performed in the order shown. An air flow F is introduced into the chamber 30 upstream from the inlet 20 of the compressor section 12 (step 100) where substantially all of the air introduced into the chamber 30 pass through one of the plurality of filter packages 50 arranged in parallel. As described above, at least some of the flow packages 50 include a flow sensor 52 and a filter structure 54, the filter structure 54 filtering the air. Each air flow sensor 52 measures the velocity of the air flowing through the corresponding filter package 50. A controller 70 uses the flow sensor 52 signal data to characterize a two dimensional flow field 80 through the chamber 30. A plurality of sensors 72 are distributed throughout the filter packages 50. The sensors 72 include pressure sensors, humidity sensors, and temperature sensors. The controller 70 uses the temperature, humidity, and static pressure signal data to characterize a density field in the chamber 3 and combines the flow field 80 with the density field to calculate an air mass flow field.

Using the signal data from the individual air flow sensors 52, the controller 70 may characterize a flow field through the chamber 30 and create a flow field map 80. The controller 70 calculates a total flow of air through each filter package 50 having a flow sensor (300) using the corresponding signal data which details the velocity of air through that filter package 50, as well as the temperature of the air in the chamber 30, and the flow area of the corresponding filter package 50. For the filter packages 50 that do not have a flow sensor 52, the controller 70 may estimate a total flow of air through each filter package 50 not having a flow sensor 52 based on a calculated total flow of air through each of the filter packages having a flow sensor (400). Using the calculations of the total air flow through each filter package 50 with a flow sensor 52 and the estimates of the total flow of air through each filter package 50 without a flow sensor 52, the controller 70 may create an interpolated flow field 80 through the chamber 30 (500).

Similarly to characterizing a flow field 80 through the chamber 30, the controller may characterize a density of air in the chamber and create an interpolated density map (600). The distributed temperature and humidity signal data is used by the controller 70 to create an interpolated two dimensional temperature field in the chamber, an interpolated two dimensional humidity field in the chamber 30, respectively, in the chamber 30. From these interpolated fields along with the static pressure measurement, an interpolated density field is created characterizing the density of air in the chamber 30.

The controller 70 may then combine the interpolated air flow field 80 with the interpolated density field (700). One way to combine the interpolated air flow field 80 with the interpolated density field would be to multiply the fields together creating an air mass flow field. Other ways of combining the interpolated air flow field 80 with the interpolated density field may also be possible. In order to obtain a total air mass flow of air through the plurality of filter packages 50 and hence through the chamber 30 itself as a single value, the air mass flow field may be integrated (summed up) (800).

The controller 70 may use the value of the total air mass flow through the chamber 30 and into the inlet 20 of the compressor to determine optimal ways to improve the efficiency of the gas turbine engine 10. For example, the controller 70 may change the operating parameters of the gas turbine engine 10 based upon the value of the total air mass flow. The operating parameters may include, but are not limited to, changing the inlet guide vane 18 position in order to regulate the flow of air into the compressor section 12 and/or change the fuel flow rate into the combustor section 14.

A correction factor may be used in the calculation of air mass flow in order to correct for a small impedance of the flow sensors 52. Because of this small impedance, slightly less air flows through the filter packages 50 with the flow sensors 52 than through those filter packages 50 that do not have a flow sensor 52. The correction factor may be based upon an initial air flow velocity through the filter packages 50. From the initial air flow velocity and the known extra air flow impedance which is a function of the air flow velocity of the air flow sensors 52, the static pressure difference between the filter packages with a flow sensor and those without a flow sensor may be calculated. The static pressure difference is the proportional difference in air flow between the filter packages with a flow sensor and the flow packages without a flow sensor The static pressure in the filter packages 50 having an air flow sensor 52 is compared with the static pressure in the filter packages without an air flow sensor 52. From this comparison, a correction factor may be determined (step 200). The correction factor may be in the form of an algorithm applied to the calculation of air mass flow in real time. Consequently, the correction factor changes based on the dirtiness of the filter packages 50 such that when the filter structures are dirty with dust, for example, the pressure differential over the filter structure 54 outweighs the pressure differential over the flow sensor 52. In this situation, the correction factor trends towards 1 and has no impact on the air mass flow calculation.

The method as discussed above may be used to determine the dirtiness of the filter structures 54 as it enables a direct flow measurement at the filter locations. With this determination, service personnel may be better informed on when the individual filters are dirty. Knowing which individual filters are dirty, enable these personnel to selectively replace or clean only the dirty filters instead of all of the filters at one time, which is common practice. Filter dirtiness may be estimated by changes in the flow distribution over time. For example, with reference to FIG. 6, the flow areas 82 of the interpolated flow field 80 denote a much higher flow than the flow area 81. Thus, flow areas 82 are collecting a higher amount of dust in the filter structures 54 within this flow area. Additionally, with the knowledge of filter dirtiness, a compressor washing may also be optimally timed. A compressor washing introduces sprayed water to the inlet of the compressor 20 which washes dirt and other accumulated materials from the compressor blades, returning them to their preferred original clean state.

Several methods may be performed to determine the dirtiness of the filter structures. A first interpolated air mass flow field compiled at a first time may be compared to a second interpolated air mass flow field compiled at a second time where the second time is later than the first time. When the flow area changes from the first time to the second time, assuming that the operating parameters of the engine are the same at the first and second times, the filter structure in a flow area may be replaced. This change in the interpolated air mass flow fields between the first and second times implies a flow change which if the operating parameters of the gas turbine engine are the same at the first and second times, indicates that the filter structure in that particular flow area is dirty. Gas turbine physical operating parameters may include but are not limited to throttle position, steam inlet pressure and steam inlet temperature, and exhaust vacuum pressure.

Another embodiment of a method to determine the dirtiness of the filter structures includes calculating a difference between a first total air mass flow at a first time and a second total air mass flow at a second time, where the second time is later than the first time. The filter structure may be replaced when the difference is above a predetermined threshold. As in the previous embodiment, the operating parameters of the turbine engine are the same at the first time and the second time.

A further embodiment of a method to determine the dirtiness of the filter structures includes an approach that combines the methodology of the two previously described methods. A first interpolated air mass flow field compiled at a first time may be compared to a second interpolated air mass flow field compiled at a second time where the second time is later than the first time. A difference between a first air mass flow within a flow area at a first time and a second air mass flow within the flow area at a second time is calculated. The filter structure may be replaced when the difference is above a predetermined threshold.

The disclosed method of measuring air mass flow as well as the system for measuring an air mass flow into a compressor section accomplishes accurate mass flow measurement with low flow impedance devices and inexpensive electronics and computing. Additionally, the flow sensors along with humidity, temperature, static pressure sensors may be distributed throughout the gas turbine air intake to accurately determine the compressor inlet mass flow. Mathematical algorithms run on a simple processor can interpolate a complete air flow field and density field of the entire gas turbine intake using only a sampling of sensors sparsely distributed throughout the gas turbine intake in front of the array of air filters. Using a sparse distribution of sensors increases the installation time as well as lowers the cost of installing the proposed system. Furthermore, the air mass flow measurement may be used to determine a degree of dirtiness of the air filters and optimize the timing of compressor washes. With this knowledge, service personnel may choose to only replace dirty filters instead of the standard practice of replacing all of the air filters at once. Replacing only a subset of all the filters could result in a significant cost savings. Finally, the method may also be performed on conical pulse filters using the proposed placement of sensors within the pulse filter.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for measuring an air mass flow into a compressor section of a gas turbine engine, comprising: introducing air into a chamber upstream from an inlet of the compressor section, wherein substantially all of the air introduced into the chamber pass through one of a plurality of filter packages arranged in parallel, at least some of the filter packages including a flow sensor and a filter structure, wherein the filter structure filters the air, utilizing by a controller the air flow sensor signal data to determine a two dimensional flow field through the chamber; disposing a plurality of sensors, the sensors measuring temperature, humidity and static pressure, distributed throughout the plurality of filter packages; utilizing by the controller the temperature, humidity and static pressure sensor signal data to determine a two dimensional density field through the chamber; combining by the controller the flow field with the density field to calculate a two dimensional air mass flow field;

changing operating parameters of the gas turbine engine based upon the two dimensional air mass flow field;

wherein the changing operating parameters of the gas turbine engine comprises one or more of changing an inlet guide vane position in order to regulate the flow of air into the compressor section and changing fuel flow rate into the combustor section;

wherein each flow sensor measures the velocity of the air flowing through the corresponding filter package.

2. The method as claimed in claim 1, calculating by the controller a total flow of air through each filter package having a flow sensor using the measured velocity of the air, a temperature distribution of the air in the chamber, and a flow area of each filter package.

3. The method as claimed in claim 2, wherein the controller creates an interpolated flow field to determine the flow field through the plurality of parallel filter packages by: using the calculated total flow of air through each filter package having a flow sensor, and estimating a total air flow through each filter package not having a flow sensor based on calculated total flow of air through each of the filter packages having a flow sensor.

4. The method as claimed in claim 3, wherein the controller creates a two dimensional interpolated density field to determine the air density through the plurality of filter packages using the temperature, humidity, and static pressure signal data.

5. The method as claimed in claim 4, wherein the combining includes multiplying the interpolated flow field and the interpolated density field to create the air mass flow field.

6. The method as claimed in claim 5, further comprising integrating the air mass flow field to determine a total mass flow of air through the plurality of parallel filter packages.

7. The method as claimed in claim 6, further comprising changing operating parameters of the gas turbine engine based upon the total mass flow of air.

8. The method as claimed in claim 7, wherein the changing operating parameters of the gas turbine engine comprises one or more of changing an inlet guide vane position in order to regulate the flow of air into the compressor section and changing fuel flow rate into a combustion section.

9. The method as claimed in claim 1, applying a correction factor to the air mass flow field based on an initial measured air flow to correct for a flow impedance through the plurality of filter packages.

10. The method as claimed in claim 1, wherein the plurality of filter packages are arranged as parallel flow measurement boxes, and wherein the plurality of flow sensors lie in the same plane parallel to the flow of air into the inlet of the compressor section.

11. The method as claimed in claim 1, wherein the plurality of filter packages are arranged as parallel conical pulse filters.

12. The method as claimed in claim 11, wherein the flow sensors are disposed within a stabilization bar in a corresponding pulse filter.

13. The method as claimed in claim 6, further comprising:
determining a filter dirtiness in the filter structure by:
    calculating a difference between a first total air mass flow at a first time and a second total air mass flow at a second time later than the first time, and
    replacing the filter structure when the difference is above a predetermined threshold, and,
wherein the operating parameters of the gas turbine engine are the same at the first time and the second time.

14. The method as claimed in claim 5, further comprising:
determining a filter dirtiness in the filter structure by:
    comparing a first interpolated air mass flow field at a first time to a second interpolated air mass flow field air at a second time later than the first time; and
    replacing the filter structure when the air mass flow in a flow area changes from the first time to the second time,
wherein the operating parameters of the gas turbine engine are the same at the first time and the second time.

15. The method as claimed in claim 5, further comprising:
determining a filter dirtiness in the filter structure by:
    comparing a first air interpolated mass flow field at a first time to a second interpolated air mass flow field air at a second time later than the first time;
    calculating a difference between a first air mass flow within a flow area at a first time and a second air mass flow within the flow area at a second time which is later than the first time;
    replacing the filter structure in the flow area when the difference is above a predetermined threshold,
wherein the operating parameters of the gas turbine engine are the same at the first time and the second time.

* * * * *